(12) United States Patent
Huang et al.

(10) Patent No.: US 8,897,379 B2
(45) Date of Patent: Nov. 25, 2014

(54) DIGITAL COMMUNICATION SYSTEM

(75) Inventors: Ren-Wen Huang, Shenzhen (CN); Yang Xin, Shenzhen (CN); Qiang You, Shenzhen (CN); Chong-Jin Ma, Shenzhen (CN); Tsung-Jen Chuang, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/563,824

(22) Filed: Aug. 1, 2012

(65) Prior Publication Data
US 2013/0034173 A1   Feb. 7, 2013

(30) Foreign Application Priority Data
Aug. 3, 2011   (CN) .......................... 2011 1 0220755

(51) Int. Cl.
H04B 3/00   (2006.01)
H04L 25/02   (2006.01)

(52) U.S. Cl.
CPC ................... *H04L 25/028* (2013.01)
USPC ........... 375/258; 330/165; 330/188; 330/195; 340/12.38; 340/538.16; 333/177

(58) Field of Classification Search
None
See application file for complete search history.

(56) References Cited

U.S. PATENT DOCUMENTS

2009/0041004 A1* 2/2009 Emmanuel .................. 370/352
2011/0299576 A1* 12/2011 Mikhemar et al. ............ 375/219

* cited by examiner

*Primary Examiner* — Adolf Dsouza
(74) *Attorney, Agent, or Firm* — Novak Druce Connolly Bove + Quigg LLP

(57) ABSTRACT

A digital communication system comprising a host and a client, the host calls the client via two transmission lines. The host includes a processor, a first control unit, a second control unit, a high frequency transformer and an interface unit. The digital communication system utilizes the first control unit and the high frequency transformer to modulate outgoing signals. The digital communication system utilizes the second unit and the high frequency transformer to demodulate incoming signals.

16 Claims, 7 Drawing Sheets

12 # DIGITAL COMMUNICATION SYSTEM

BACKGROUND

1. Technical Field

The present disclosure relates to a digital communication system.

2. Description of Related Art

Analog communication systems are utilized in, for example, telephone switching systems, security systems, building management systems and so on, but disturbances introduced into the analog system may result in errors that are difficult to detect and correct. This is an inconvenience especially during analog audio communication.

Therefore, a system to overcome the above described shortcomings is desired.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will be made to the drawings to describe various embodiments in detail.

Figure 1:
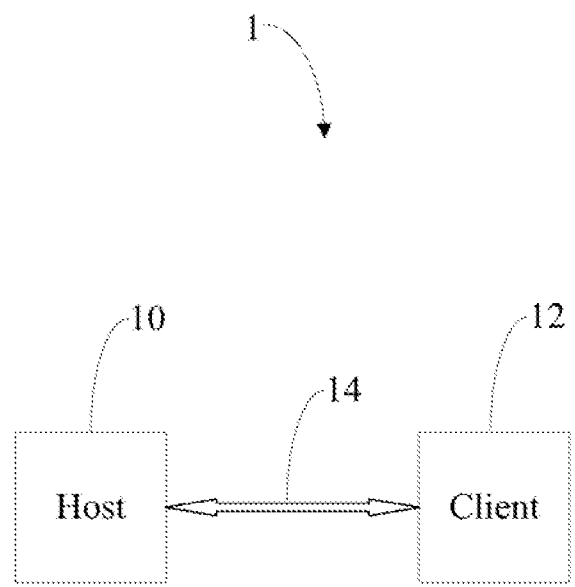
FIG. 1 is a block diagram of a digital communication system according to one embodiment of a disclosure, the digital communication system including a host and a client.

FIG. 1 is a block diagram of a digital communication system 1 according to one embodiment of present disclosure. The digital communication system 1 includes a host 10 and a client 12. The host 10 connects to the client 12 via a transmission line 14. In this embodiment, the transmission line 14 includes two conductive lines. In one embodiment, the host 10 first calls the client 12 to create a communication therebetween. In an alternative embodiment, the client 12 first calls the host 10 to create a communication therebetween.

Figure 2:
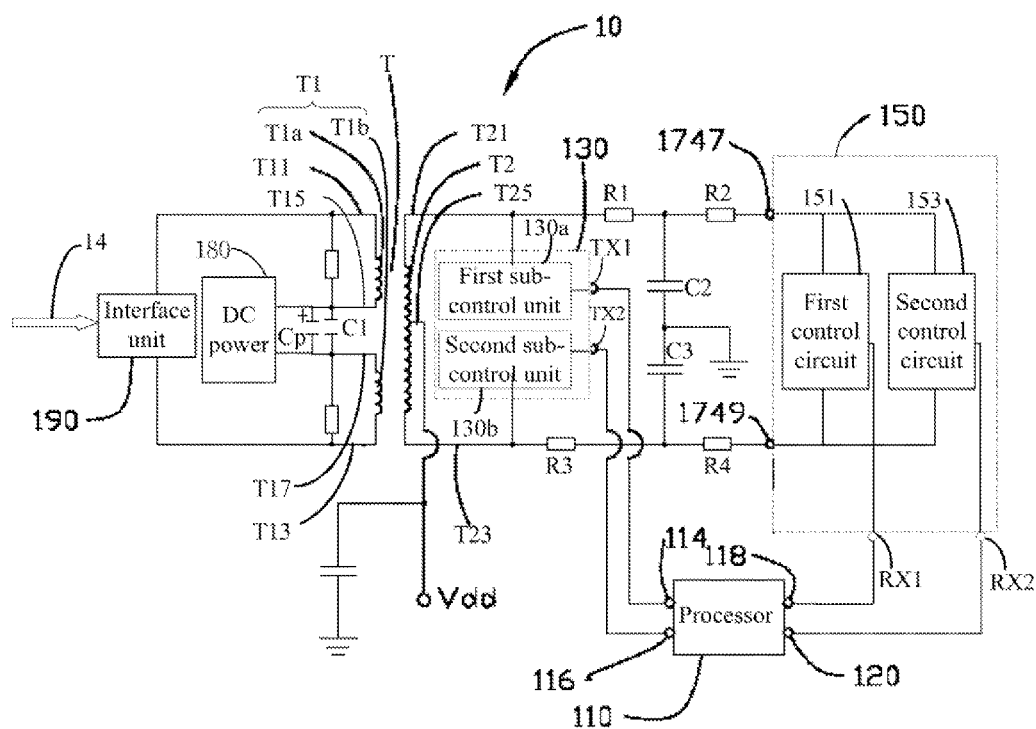
FIG. 2 is a circuit diagram of the host of the digital communication system of FIG. 1 according to one embodiment of present disclosure.

In this embodiment, the host 10 and the client 12 have the same circuit structure except that the host 10 includes a (direct current) DC power source 180, as shown in FIG. 2, which is configured for supplying power to the client 12 via the transmission line 14, and only the host 10 is described below as an instance.

Referring to FIG. 2, the host 10 includes a processor 110, a first control unit 130, a second control unit 150, a high frequency transformer T and an interface unit 190.

Figure 3:
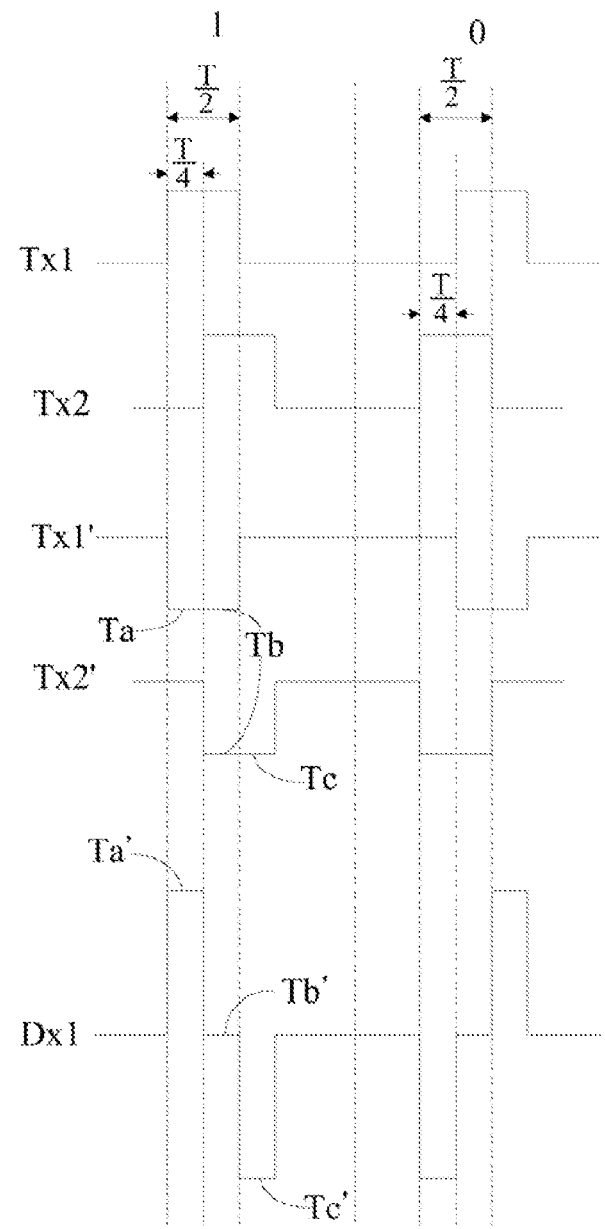
FIG. 3 is an illustration showing waveforms of a first channel signal, a second channel, and a first digital signal of the digital communication system of FIG. 2 according to one embodiment.

The processor 110 includes a first output terminal 114 and a second output terminal 116. Referring to FIG. 3, the processor 110 outputs a first channel signal Tx1 and a second channel signal Tx2 via the first output terminal 114 and the second output terminal 116, respectively. The first channel signal Tx1 and the second channel signal Tx2 follow a communication protocol which distinguishes logic "1" and logic "0" by a phase difference, such as 90 degrees. The first channel signal Tx1 and the second channel signal Tx2 can be modulated into a first digital signal Dx1 as shown in FIG. 3 by the first control unit 130 and the high frequency transformer T, and then transmitted to the client 12 via the interface unit 190.

The high frequency transformer T includes a primary winding T1 and a secondary winding T2.

The primary winding T1 includes a first sub-winding T1a and a second sub-winding T1b. The first sub-winding T1a includes a first terminal T11, and a third terminal T15; the second sub-winding T1b includes a second terminal T13, and a fourth terminal T17. The first terminal T11 and the second terminal T13 connect to the transmission line 14 via the interface unit 190. The third terminal T15 and the fourth terminal T17 connect to two outputs (not labeled) of the DC power 180. The third terminal T15 also connects to the fourth terminal T17 via an electrolytic capacitor Cp and a first capacitor C1. The DC power source 180 is configured for supplying power to the host 10 and the client 20 and providing a DC carrier voltage for the first digital signal Dx1 to the client 12.

The secondary winding T2 includes a fifth terminal T21, a sixth terminal T23 and a seventh terminal T25. The seventh terminal T25 is a tap terminal between the fifth terminal T21 and the sixth terminal T23. The fifth terminal T21 and the sixth terminal T23 connect to the first control unit 130.

The first control unit 130 includes a first input TX1 for receiving the first channel signal Tx1 and a second input TX2 for receiving the second channel signal Tx2. The first control unit 130 and the high frequency transformer T modulate the first channel signal Tx1 and the second channel signal Tx2 into the first digital signal Dx1 as shown in FIG. 3. The first digital signal Dx1 is transmitted to the client 12 via the interface unit 190 and the transmission line 14.

The second control unit 150 includes a third input 1747 and a fourth input 1749.

The fifth terminal T21 connects to the third input 1747 via a first resistor R1 and a second resistor R2; the sixth terminal T23 connects to the fourth input 1749 via a third resistor R3 and a fourth resistor R4. A node between the first resistor R1 and the second resistor R2 is grounded via a second capacitor C2. A node between the third resistor R3 and the fourth resistor R4 is grounded via a third capacitor C3. The first resistor R1, the second resistor R2, the third resistor R3, and the fourth resistor R4 are configured for reducing the impedance characteristics of the transmission line 14. The second capacitor C2 and the third capacitor C3 are configured for filtering out noise generated from the high frequency transformer T. The seventh terminal T25 is configured to receive a driving voltage Vdd. In one embodiment, the ratio of the number of turns of the first sub-winding T1a and the number of turns of the secondary winding T2 between the fifth terminal T21 and the tap terminal T25 is 2:1; the ratio of the number of turns of the second sub-winding T1b and the number of turns of the secondary winding T2 between the sixth terminal T23 and the seventh terminal T25 is also 2:1.

The first control unit 130 includes a first sub-control unit 130a, and a second sub-control unit 130b. The first sub-control unit 130a includes a control input terminal connecting to the first input TX1 for receiving the first channel signal Tx1 and a control output terminal connecting to the fifth terminal T21 for providing a first pulse signal Tx1', as shown in FIG. 3, to the fifth terminal T21; the second sub-control unit 130b also includes a control input terminal connecting to the second input TX2 for receiving the second channel signal Tx2 and a control output terminal connecting to the sixth terminal T23 for providing a second pulse signal Tx2', as shown in FIG. 3, to the sixth terminal T23. The first sub-control unit 130a and the second sub-control unit 130b have the same circuit structure and only the first sub-control unit 130a is described below.

Figure 4:
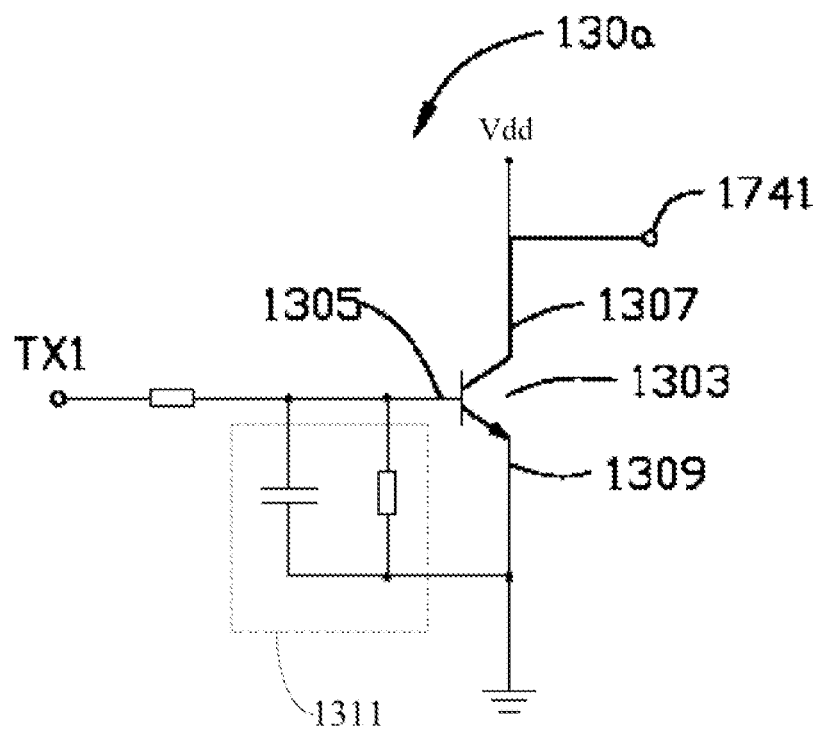
FIG. 4 is a schematic circuit diagram of a first sub-control unit employed in the host of the digital communication system of FIG. 2 according to one embodiment.

Referring to FIG. 4, the first sub-control unit 130a is a transistor circuit. In an alternative embodiment, the transistor circuit is a common emitter transistor circuit. The first sub-control unit 130a includes a transistor 1303. The transistor 1303 includes a control terminal 1305, a first conducting terminal 1307 and a second conducting terminal 1309. The control terminal 1305 functions as the control input terminal of the first sub-control unit 130a. The second conducting terminal 1309 is grounded. The first conducting terminal 1307 functions as the control output terminal of the first sub-control unit 130a. The first conducting terminal 1307 also electrically connects to the driving voltage Vdd. In an alternative embodiment, the sub-control unit 130a further includes an RC filtering circuit 1311 between the control terminal 1305 and the second conducting terminal 1309. In this embodiment, the transistor 1303 is an npn-type bipolar junction transistor (npn-BJT).

As shown in FIG. 4, the different waves of digital pulses indicated by logic "1" and the logic "0" are modulated in the same way and only the digital pulses indicated by the logic "1" is described below. When the first input TX1 outputs the first channel signal Tx1 to the control terminal 1305, the transistor 1303 inverses the first channel signal Tx1 into the first pulse signal Tx1'. When only the first pulse signal Tx1' is a logic low signal Ta, the second capacitor C2 is charged by the driving voltage Vdd via a half of the secondary winding T2, thus part of the logic low signal Ta is coupled to the interface unit 190 and is transformed into a first part Ta' of the first digital signal Dx1 as shown in FIG. 3.

When the first pulse signal Tx1' and the second pulse signal Tx2' are both a logic low signal Tb, then as the first terminal T11 and the second terminal T13 have opposite polarity, the two signals are coupled to the first sub-winding T1a and transformed into a second part Tb' of the first digital signal Dx1 as shown in FIG. 3.

When only the second pulse signal Tx2' is a logic low signal Tc, then the third capacitor C3 is charged by the driving voltage Vdd via the other half of the secondary winding T2, so part of the logic low signal Tc of the second pulse signal Tx2' is coupled to the second sub-winding T1b and transformed into a third part Tc' of the first digital signal Dx1 as shown in FIG. 3.

Figure 5:
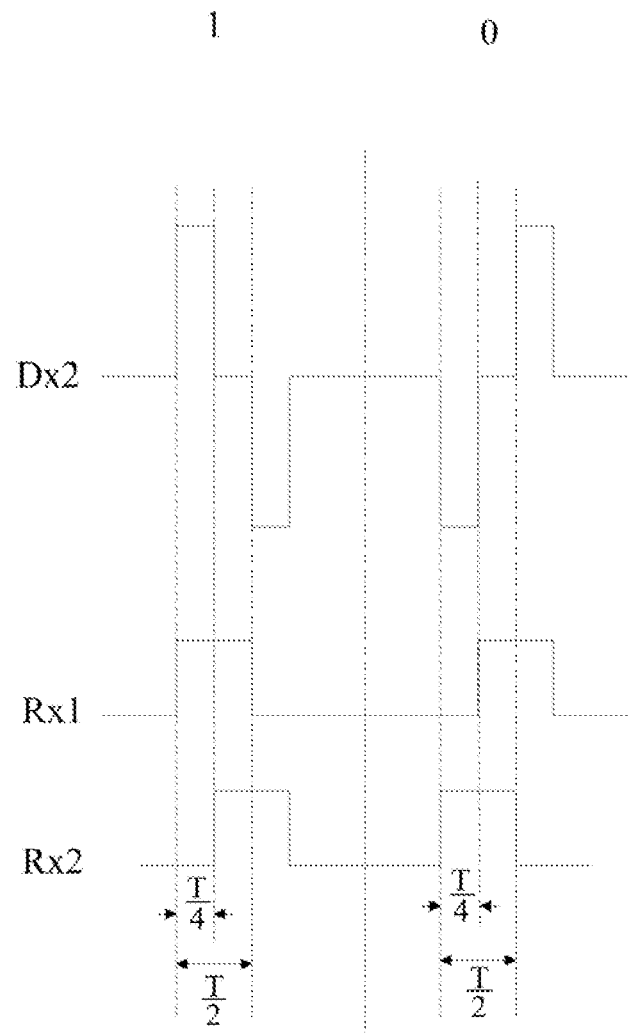
FIG. 5 is an illustration showing waveforms of a third channel signal, a fourth channel, and a second digital signal of the digital communication system of FIG. 2 according to one embodiment.

In operation, the host 10 receives the second digital signal Dx2 output by the client 12. The demodulation of the second digital signal Dx2 is a reverse process of the modulation of the first digital signal Dx1. Referring to FIG. 5, the second control unit 150 and the high frequency transformer T demodulate the second digital signal Dx2 to a third channel signal Rx1 and a fourth channel signal Rx2, to the processor 110. The second control unit 150 further includes a first output RX1 for outputting the third channel signal Rx1 and a second output RX2 for outputting the fourth channel signal Rx2. The processor 110 further includes a first input terminal 118 for receiving the third channel signal Rx1 and a second input terminal 120 receiving the fourth channel signal Rx2. The primary winding T1 receives the second digital signal Dx2 via the transmission line 14 and the interface unit 190. The second digital signal Dx2 is coupled to the secondary winding T2 via the primary winding T1 and transmitted into the second control unit 150. The second control unit 150 outputs the third channel signal Rx1 and the fourth channel signal Rx2, as shown in FIG. 5, via the first output RX1 and the second output RX2. The processor 110 receives the third channel signal Rx1 and the fourth channel signal Rx2 via the first input terminal 118 and the second input terminal 120.

Figure 6:
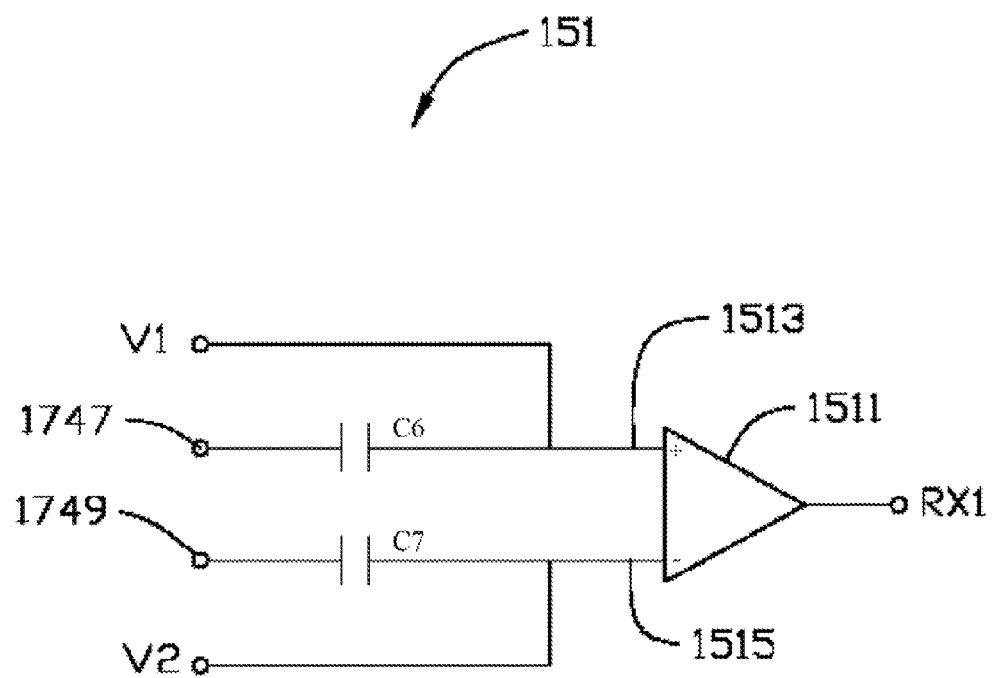
FIG. 6 is a schematic circuit diagram of a first control circuit employed in the host of the digital communication system of FIG. 2 according to one embodiment.

The second control unit 150 includes a first control circuit 151 and a second control circuit 153. Referring to FIG. 6, the first control circuit 151 includes a comparator 1511. The comparator 1511 includes a non-inverting input 1513, an inverting input 1515 and an output RX1. The non-inverting input 1513 connects to the third input 1747 of the second control unit 150 via a sixth capacitor C6. The non-inverting input 1513 also connects to a first bias voltage V1. The inverting input 1515 connects to the fourth input 1749 via a seventh capacitor C7. The inverting input 1515 also connects to a second bias voltage V2. The first bias voltage V1 and the second bias voltage V2 is provided an external DC source.

Figure 7:
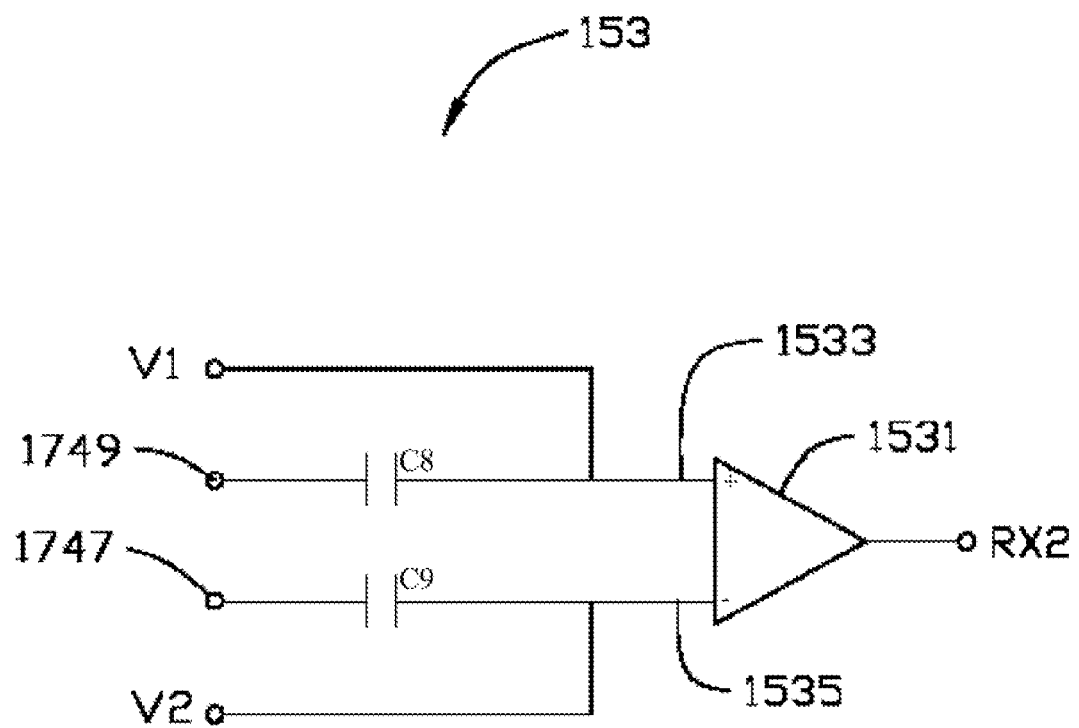
FIG. 7 is a schematic circuit diagram of a second control circuit employed in the host of the digital communication system of FIG. 2 according to one embodiment.

Referring to FIG. 7, the second control circuit 153 includes a comparator 1531. The comparator 1531 includes a non-inverting input 1533, an inverting input 1535 and an output RX2. The non-inverting input 1533 connects to the fourth input 1749 via an eighth capacitor C8. The non-inverting input 1533 also connects to the first bias voltage V1. The inverting input 1535 connects to the third input 1747 via a ninth capacitor C9. The inverting input 1535 also connects to the second bias voltage V2.

The comparator 1511 outputs the third channel signal Rx1 via the output RX1 by comparing signals received from the non-inverting input 1513 and from the inverting input 1515. The comparator 1531 outputs the fourth channel signal Rx2 via the output RX2 by comparing signals received from the non-inverting input 1533 and from the inverting input 1535.

In one embodiment, the first bias voltage V1 and the second bias voltage V2 are set according to the amplitude of the third channel signal Rx1 and the fourth channel signal Rx2. For example, when the amplitude of the third channel signal Rx1 and the fourth channel signal Rx2 is 5V, the first bias voltage V1 is set as 3.5V, and the second bias voltage V2 is set as 2.8V.

In one embodiment, the interface unit 190 is a RJ11 interface.

It is to be understood that even though numerous characteristics and advantages of the present embodiments have been set forth in the foregoing description, with details of the structures and functions of the embodiments, the disclosure is illustrative only; and that changes may be in detail, especially in the matters of arrangement of parts within the principles of the embodiments to the full extent indicated by the broad general meaning of the terms in which the appended claims are expressed.

What is claimed is:

1. A digital communication system comprising:
a host communicated with a client via an interface unit;
the host comprising a processor, a first control unit, and a high frequency transformer comprising a primary winding and a secondary winding,
wherein the primary winding comprises a first sub-winding and a second sub-winding; the first sub-winding comprises a first terminal and a third terminal; the second sub-winding comprises a second terminal and a fourth terminal; the first terminal and the second terminal connect to the interface unit; the third terminal and the fourth terminal connect to a direct current (DC) power; when the host communicates with the client, the processor outputs a first channel signal and a second channel signal to the first control unit, the first control unit and the high frequency transformer modulate the first channel signal and the second channel signal into a first digital signal, and the first digital signal is transmitted to the client via the interface unit.

2. The digital communication system of claim 1, wherein the first channel signal and the second channel signal follow a communication protocol which distinguishes logic "1" and logic "0" by phase difference.

3. The digital communication system of claim 2, wherein the phase difference is 90 degrees.

4. The digital communication system of claim 2, wherein the processor comprises a first output terminal configured for outputting the first channel signal and a second output terminal configured for outputting the second channel signal.

5. The digital communication system of claim 1, wherein the DC power is configured for supplying power to the host and providing a DC carrier voltage for the first digital signal.

6. The digital communication system of claim 1, wherein the secondary winding comprises a fifth terminal, a sixth terminal and a seventh terminal; the fifth terminal and the sixth terminal connect to the first control unit; the seventh terminal connects to a driving voltage.

7. The digital communication system of claim 6, wherein the ratio of the number of turns of the first sub-winding and the number of turns of the secondary winding between the fifth terminal and the seventh terminal ratio is 2:1.

8. The digital communication system of claim 7, wherein the first control unit comprises a first sub-control unit and a second sub-control unit; the first sub-control unit is configured for providing a first pulse signal for the fifth terminal; the second sub-control unit is configured for providing a second pulse signal for the sixth terminal.

9. The digital communication system of claim 8, wherein the first sub-control unit and the second sub-control unit are both common emitter transistor circuit.

10. The digital communication system of claim 9, wherein the transistor comprises a control terminal, a first conducting terminal and a second conducting terminal; the control terminal connects to a first input of the first control unit, the second conducting terminal is grounded, the first conducting terminal connects to the fifth terminal.

11. The digital communication system of claim 10, wherein the sub-control unit further comprises an RC filtering circuit between the control terminal and the second conducting terminal.

12. The digital communication system of claim 11, wherein the host further comprises a second control unit; when the client communicates with the host, the interface unit receives a second digital signal, the high frequency transformer and the second control unit demodulate the second digital signal into a third channel signal and a fourth channel signal to the processor; the first resistor also connects to the third resistor via a second capacitor and a third capacitor, the second capacitor is grounded, the third channel signal and the fourth channel signal follow a communication protocol which distinguishes logic "1" and logic "0" by phase difference.

13. The digital communication system of claim 12, wherein the second control unit comprises a third input for connecting to the fifth terminal via a first resistor and a second resistor; a fourth input for connecting to the sixth terminal via a third resistor and a fourth resistor.

14. The digital communication system of claim 12, wherein the second control unit comprises a first control circuit, the first control circuit comprises a comparator, the noninverting input of the comparator connects to the third input of the second control unit via a capacitor, the noninverting input of the comparator also connects to a first bias voltage; the inverting input of the comparator connects to the fourth input via a capacitor, the inverting input of the comparator also connects to a second bias voltage.

15. The digital communication system of claim 13, wherein the second control unit further comprises a second control circuit, the second control circuit comprises a comparator, the noninverting input of the comparator connects to the fourth input of the second control unit via a capacitor, the noninverting input of the comparator also connects to a first bias voltage; the inverting input of the comparator connects to the third input via a capacitor, the inverting input of the comparator also connects to a second bias voltage.

16. A digital communication system comprising:
a host communicated with a client via an interface unit;
the host comprising a processor, a first control unit, and a high frequency transformer;
wherein the processor outputs a first channel signal and a second channel signal, the high frequency transformer modulates the first channel signal and the second channel signal into a first digital signal and transmitting the first digital signal to the client via the interface unit, and the high frequency transformer connects to a direct current (DC) power to supply power to the host and to provide a DC carrier voltage for the first digital signal; and
wherein the high frequency transformer comprises a primary winding and a secondary winding, the primary winding comprises a first sub-winding and a second sub-winding; the first sub-winding comprises a first terminal and a third terminal; the second sub-winding comprises a second terminal and a fourth terminal; the first terminal and the second terminal connect to the interface unit; the third terminal and the fourth terminal connect to the DC power.

* * * * *